(12) United States Patent
Zhang et al.

(10) Patent No.: US 10,306,225 B2
(45) Date of Patent: May 28, 2019

(54) METHOD OF TEXTURE MERGING CANDIDATE DERIVATION IN 3D VIDEO CODING

(71) Applicant: HFI INNOVATION INC., Zhubei, Hsinchu County (TW)

(72) Inventors: Kai Zhang, Beijing (CN); Jicheng An, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 316 days.

(21) Appl. No.: 14/779,431

(22) PCT Filed: May 20, 2014

(86) PCT No.: PCT/CN2014/077859
§ 371 (c)(1),
(2) Date: Sep. 23, 2015

(87) PCT Pub. No.: WO2015/000339
PCT Pub. Date: Jan. 8, 2015

(65) Prior Publication Data
US 2016/0050435 A1    Feb. 18, 2016

(30) Foreign Application Priority Data

Jul. 1, 2013   (WO) ................ PCT/CN2013/078579

(51) Int. Cl.
*H04N 13/10*       (2018.01)
*H04N 13/106*      (2018.01)
(Continued)

(52) U.S. Cl.
CPC ........... *H04N 19/119* (2014.11); *H04N 13/10* (2018.05); *H04N 13/106* (2018.05);
(Continued)

(58) Field of Classification Search
None
See application file for complete search history.

(56) References Cited

U.S. PATENT DOCUMENTS 9,641,842 B2 *    5/2017   Pandit .................. H04N 19/597
2009/0304068 A1 * 12/2009  Pandit .................. H04N 19/597
                                                         375/240.01
(Continued)

FOREIGN PATENT DOCUMENTS

CN    101835056    9/2010
CN    102055982    5/2011

OTHER PUBLICATIONS

Y. Chen, H. Liu, & L. Zhang, "CE2: Sub-PU based MPI", JCT3V Document G0119 (Jan. 3, 2014) (Year: 2014).*

(Continued)

*Primary Examiner* — David N Werner
(74) *Attorney, Agent, or Firm* — Oblon, McClelland, Maier & Neustadt, L.L.P.

(57) ABSTRACT

A method of depth map coding for a three-dimensional video coding system incorporating consistent texture merging candidate is disclosed. According to the first embodiment, the current depth block will only inherit the motion information of the collocated texture block if one reference depth picture has the same POC (picture order count) and ViewId (view identifier) as the reference texture picture of the collocated texture block. In another embodiment, the encoder assigns the same total number of reference pictures for both the depth component and the collocated texture component for each reference list. Furthermore, the POC (picture order count) and the ViewId (view identifier) for both the depth image unit and the texture image unit are assigned to be the same for each reference list and for each reference picture.

12 Claims, 3 Drawing Sheets

(51) Int. Cl.
*H04N 13/122* (2018.01)
*H04N 13/128* (2018.01)
*H04N 19/119* (2014.01)
*H04N 19/176* (2014.01)
*H04N 19/597* (2014.01)
*H04N 19/44* (2014.01)
*H04N 19/172* (2014.01)
*H04N 19/463* (2014.01)

(52) U.S. Cl.
CPC ......... *H04N 13/122* (2018.05); *H04N 13/128* (2018.05); *H04N 19/176* (2014.11); *H04N 19/597* (2014.11); *H04N 19/172* (2014.11); *H04N 19/44* (2014.11); *H04N 19/463* (2014.11)

(56) References Cited

U.S. PATENT DOCUMENTS

| | | | |
|---|---|---|---|
| 2012/0236934 A1 | 9/2012 | Chen et al. | |
| 2013/0128977 A1* | 5/2013 | Yu | H04N 19/52 375/240.16 |
| 2014/0146137 A1* | 5/2014 | Yea | H04N 19/597 348/43 |
| 2014/0218473 A1* | 8/2014 | Hannuksela | H04N 19/597 348/43 |
| 2014/0294088 A1* | 10/2014 | Sung | H04N 19/597 375/240.16 |
| 2015/0022633 A1* | 1/2015 | Zhang | H04N 19/597 348/43 |
| 2015/0208086 A1* | 7/2015 | Chen | H04N 19/597 375/240.17 |
| 2015/0304681 A1* | 10/2015 | An | H04N 19/597 375/240.16 |
| 2016/0029045 A1* | 1/2016 | An | H04N 19/597 375/240.24 |
| 2016/0330472 A1* | 11/2016 | Han | H04N 19/52 |

OTHER PUBLICATIONS

International Search Report dated Aug. 14, 2014, issued in application No. PCT/CN2014/077859.

* cited by examiner

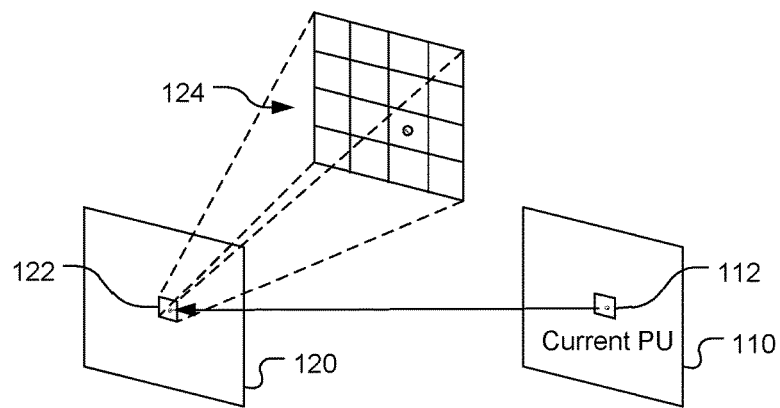

Fig. 1

```
for ( X=0,1)
{                                    → 210a
    if ( X==0||IsBSlice )
        for( i=0... NumRefPicsLX-1 )    → 220a
        {                               → 230a
            Y=1-X
            if   ( textColPredFlagLX==1 &&
                   textColRefPOCLX==RefPOCLX(i) &&    } 240
                   textColRefViewIdLX== RefViewIdLX(i))
            {
                PredFlagLX = 1, RefIdxLX=i, MvLXT=textColMVLX, break  } 250
            }
            else if   ( textColPredFlagLY==1 &&
                        textColRefPOCLY==RefPOCLX(i) &&    } 260
                        textColRefViewIdLY==RefViewIdLX(i))
            {
                PredFlagLX = 1, RefIdxLX=i, MvLXT=textColMVLY, break  } 270
            }
                                        → 230b
        }                               → 220b
}                 → 210b
```

Fig. 2

METHOD OF TEXTURE MERGING CANDIDATE DERIVATION IN 3D VIDEO CODING

CROSS REFERENCE TO RELATED APPLICATIONS

The present invention is a National Phase of Application No. PCT/CN2014/077859, filed on May 20, 2014, which claims priority to PCT Patent Application, Serial No. PCT/CN2013/078579, filed on Jul. 1, 2013, entitled "An improved texture merging candidate in 3DVC". The PCT Patent Applications are hereby incorporated by reference in their entirety.

FIELD OF THE INVENTION

The present invention relates to three-dimensional video coding. In particular, the present invention relates to texture merging candidate derivation for depth map coding in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing and the multi-view video is a key technology for 3DTV application among others. For 3D coding, depth maps are also coded along with the texture data. In typical scenes, the correlation between the texture pictures and the depth maps is usually very high. In order to improve coding efficiency for depth maps, coding parameters for collocated texture pictures may be used for depth map coding.

In the current 3D-HEVC, the texture merging candidate is also used for depth Merge mode. In texture merging mode, motion parameters such as motion vectors (MV) and reference indices are inherited directly from the collocated block in the texture picture. FIG. 1 illustrates an example of corresponding texture block derivation. Depth block 112 in depth picture 110 corresponds to a current depth prediction unit (PU). Texture block 122 in collocated texture picture 120 corresponds to a collocated texture block. The collocated texture block (122) may be further partitioned into sub-blocks 124. If the current depth PU (112) merges with the texture merging candidate (122), the current depth PU will inherit the motion information from the collocated texture block. In the current draft 3D-HEVC, the texture merging candidate for the depth map coding is derived as follows:

$$mvLXT[0]=(\text{text}MvLX[x\text{Ref}][y\text{Ref}][0]+2)>>2,$$

$$mvLXT[1]=(\text{text}MvLX[x\text{Ref}][y\text{Ref}][1]+2)>>2, \text{ and}$$

$$\text{ref}IdxLX=\text{textRef}IdxLX[x\text{Ref}][y\text{Ref}].$$

In the above equations, mvLXT[0] and mvLXT[1] correspond to the MV candidates for the depth PU in the x and y directions. The MV candidates are determined from the MVs of the collocated texture block. Furthermore, the texture MVs is scaled down by a factor of 4 to match the spatial resolution of the depth picture since the MV for texture component has a quarter-pel resolution while the depth component has integer resolution. If the texture component and the depth component had the same resolution, there would be no need for the scaling operation.

In a coding system, it is possible for an encoder to configure the reference lists of the texture component and the depth component differently. If a reference index represents reference pictures in the texture component and the depth component with different POC or ViewId, the inherited MVs will be incorrect or inaccurate. Furthermore, such system may also result in a reference index for the texture component that is invalid for the depth component. This could cause system crash if the situation is not taken care properly.

Accordingly, it is desirable to develop a method and system that can result in reliable texture merging candidate for depth map coding. At the same time, it is desirable that the developed system can retain the performance without noticeable performance degradation.

BRIEF SUMMARY OF THE INVENTION

A method of depth map coding for a three-dimensional coding system incorporating consistent texture merging candidate according to the present invention is disclosed. According to the first embodiment, the current depth block will only inherit the motion information of the collocated texture block if the reference depth picture has the same POC (picture order count) and ViewId (view identifier) as the reference texture picture of the collocated texture block. In other words, the texture merging candidate is selected based on the collocated texture block if the reference depth picture has the same POC (picture order count) and ViewId (view identifier) as the reference texture picture of the collocated texture block. If no reference depth picture in the reference lists can satisfy this condition, the texture merging candidate will not be selected for encoding the depth block. The reference texture picture associated with said same POC and ViewId has a reference texture index and the reference texture index can be different from the reference depth index. If no reference depth picture in reference list 0 or reference list 1 has said same POC and ViewId as the reference texture picture, said reference list 0 or said reference list 1 is not used.

No valid texture merging candidate will be selected if the current depth picture is a P-picture and list 0 is not used. Also, no valid texture merging candidate will be selected if the current depth picture is a B-picture and either list 0 or list 1 is not used. A motion vector of the texture merging candidate is scaled if no reference depth picture in reference list 0 or reference list 1 has said same POC and ViewId as the reference texture picture, where the motion vector is associated with one reference texture picture in said reference list 0 or said reference list 1.

In another embodiment, the encoder restricts the reference picture process to generate consistent texture merging candidate. The total number of reference pictures for both a depth image unit and a texture image unit collocated with the depth image unit for each reference list are configured to be the same for reference list from list 0 to list 1. Furthermore, the same POC (picture order count) and the same ViewId (view identifier) for both the depth image unit and the texture image unit are configured to be the same for each reference list and for each reference picture. The depth image unit corresponds to a depth slice and the texture image unit corresponds to a texture slice.

BRIEF DESCRIPTION OF THE DRAWINGS

FIG. 1 illustrates an example of texture merging candidate derivation for depth map coding in a three-dimensional coding system.

FIG. 2 illustrates an exemplary pseudo code for implementing one embodiment of the present invention, where the reference pictures are configured to have the same structure for both the texture component and the depth component.

DETAILED DESCRIPTION OF THE INVENTION

Figure 3:
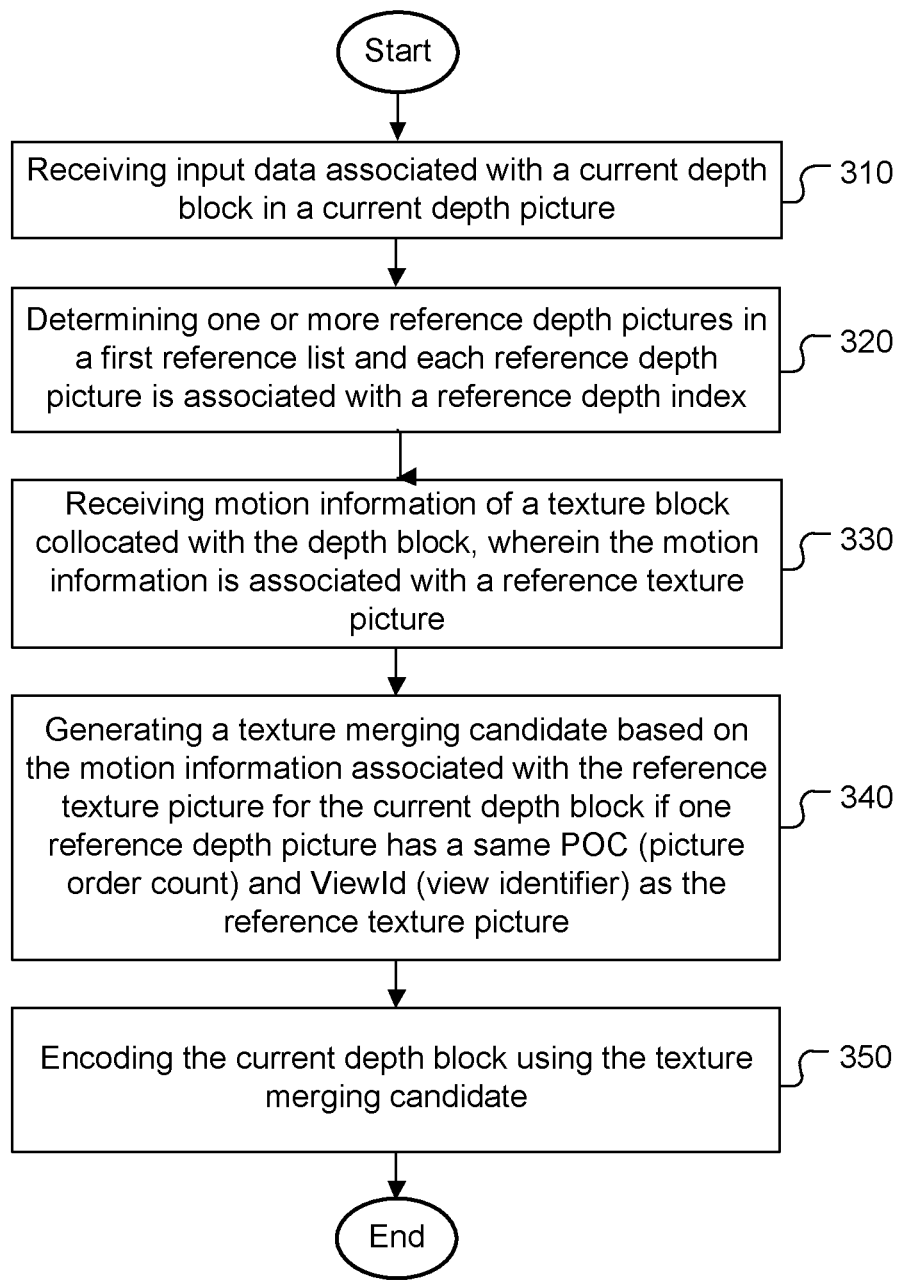
FIG. 3 illustrates an exemplary flowchart of a three-dimensional coding system incorporating texture merging candidate derivation according to one embodiment of the present invention.

As mentioned above, the depth map coding according to the current 3D-HEVC may experience incorrect or inaccurate motion information inherited from texture merging candidate. Accordingly, the present invention modifies the derivation of texture merging candidate to ensure the motion information inherited by a collocated depth PU is consistent so that the inherited motion information will be always correct and accurate.

In one embodiment, the inherited reference picture for the texture merging mode always uses the same POC (picture order count) and ViewId (view identifier) as the reference picture of the collocated block in the texture picture. If no reference picture in the reference lists can satisfy this condition, the texture merging candidate will be treated as invalid for this block. Accordingly, if the texture merging candidate does get selected, the motion information inherited will be correct and accurate. FIG. 2 illustrates an exemplary pseudo code to implement an embodiment of the present invention.

As shown in FIG. 2, the derivation of texture merging candidate is performed according to an embodiment of the present invention. The steps between 210a and 210b are performed for list 0 (i.e., X=0) and list 1 (i.e., X=1). Since only B slices will involve both list 0 and list 1, a test, (X==0||IsBSlice) is performed in step 220a. If X=1 and the slice is not a B slice, the steps from 220a to 220b will not be performed. The steps between 230a and 230b are performed for each depth reference map. Steps 240 and 250 are performed for X=0 and steps 260 and 270 are performed for X=1. In step 240, whether the depth map has a same POC (i.e., RefPOCLX(i)) as the collocated texture reference picture (i.e., textColPOCLX) and whether the depth map has a same ViewId (i.e., RefViewIdLX(i)) as the collocated texture reference picture (i.e., textColViewIdLX) is checked. If the condition in 240 is asserted, the prediction flag for list 0 is set (i.e., PredFlagLX=1), the reference depth map index is pointed to this reference depth map (i.e., RefIdxLX=i) and the corresponding texture motion vector is inherited as the motion vector for the depth map (i.e., MxLXT=textColMVLX). Steps 260 and 270 are similar to steps 240 and 250 and are performed when X=1 and the slice is a B slice. The pseudo code in FIG. 2 is intended to illustrate one example of syntax design to support one embodiment of the present invention. A skilled person may use other syntax design to implement the present invention. For example, the derivation of the texture merging candidate in FIG. 2 is performed for each depth slice. The derivation of the texture merging candidate can also be performed for any depth image unit. Other than a slice, the image unit may also correspond to a picture, a region or a tile.

In another embodiment, the reference pictures for depth block and texture block are restricted to have the same POC and ViewId as follows. First, the number of reference pictures in a texture slice and a depth slice is restricted to be the same for list 0 and list 1. Furthermore, for each reference picture, the associated index and POC are restricted to be the same for a texture slice and a depth slice. For example, for a current depth slice, the reference picture in List X with reference index equal to idx is denoted as DMRefPOCLX (idx), where X=0 to 1. For the collocated texture slice, the reference picture in List X with reference index equal to idx is denoted as TxtRefPOCLX(idx). According to this embodiment, the number of reference pictures in List X denoted as numRefLX is restricted to be the same for the depth slice and the corresponding texture slice for X=0 to 1. Also for each idx from 0 to numRefLX-1, the POC of DMRefPOCLX(idx) is restricted to be the same as the POC of TxtRefPOCLX(idx), and the ViewId of DMRefPOCLX (idx) is restricted to be the same as the ViewId of TxtRefPOCLX(idx) for X from 0 to 1.

As mentioned earlier, the present invention is intended to overcome potential issue of motion information inheritance from the texture merging candidate. Embodiments of the present invention will always result consistent reference pictures for the texture component and the depth component. Therefore, the motion information inherited from texture merging candidate will be correct and accurate. The design target for the present invention is to maintain the performance while overcoming the motion information inheritance issue. The performance of a 3D video coding system incorporating texture-depth consistent motion information inheritance is compared to the performance of a conventional system based on HTM-7.0 (High Efficiency Video Coding, HEVC Test Model version 7.0) as shown in Table 1. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, BD-rate measure for view 1 and view 2 is the same as the conventional HTM-7.0. The BD-rate measure for the coded video PSNR with video bitrate, the coded video PSNR with total bitrate (texture bitrate and depth bitrate), and the synthesized video PSNR with total bitrate are all about the same as the conventional HTM-7.0. The processing times (encoding time, decoding time and rendering time) are also the same. As shown in Table 1, slight decreases in encoding time, decoding time and rendering time (1.3, 3.9 and 0.5%) are noted.

TABLE 1

|  | Video 1 | Video 2 | Video PSNR/video bitrate | Video PSNR/total bitrate | Synth PSNR/total bitrate | Enc time | Dec time | Ren time |
| --- | --- | --- | --- | --- | --- | --- | --- | --- |
| Balloons | 0.0% | 0.0% | 0.0% | 0.0% | 0.0% | 98.2% | 91.8% | 99.2% |
| Kendo | 0.0% | 0.0% | 0.0% | 0.0% | 0.0% | 98.6% | 99.0% | 99.4% |

TABLE 1-continued

|  | Video 1 | Video 2 | Video PSNR/video bitrate | Video PSNR/total bitrate | Synth PSNR/total bitrate | Enc time | Dec time | Ren time |
|---|---|---|---|---|---|---|---|---|
| Newspapercc | 0.0% | 0.0% | 0.0% | 0.0% | 0.0% | 98.2% | 92.4% | 95.5% |
| GhostTownFly | 0.0% | 0.0% | 0.0% | 0.0% | 0.0% | 99.4% | 91.4% | 99.9% |
| PoznanHall2 | 0.0% | 0.0% | 0.0% | 0.0% | 0.0% | 98.7% | 98.9% | 99.7% |
| PoznanStreet | 0.0% | 0.0% | 0.0% | 0.0% | 0.0% | 99.0% | 91.1% | 102.0% |
| UndoDancer | 0.0% | 0.0% | 0.0% | 0.0% | 0.0% | 98.7% | 108.0% | 100.7% |
| 1024 × 768 | 0.0% | 0.0% | 0.0% | 0.0% | 0.0% | 98.3% | 94.4% | 98.1% |
| 1920 × 1088 | 0.0% | 0.0% | 0.0% | 0.0% | 0.0% | 99.0% | 97.4% | 100.6% |
| average | 0.0% | 0.0% | 0.0% | 0.0% | 0.0% | 98.7% | 96.1% | 99.5% |

FIG. 3 illustrates an exemplary flowchart of a three-dimensional coding system incorporating texture merging candidate derivation according to an embodiment of the present invention. The system receives a current depth block in a current depth picture in step 310. One or more reference depth pictures in a first reference list are determined and each reference depth picture is associated with a reference depth index as shown in step 320. The motion information of a texture block collocated with the depth block is received as shown in step 330, where the motion information is associated with a reference texture picture. A texture merging candidate is generated based on the motion information associated with the reference texture picture for the current depth block if one reference depth picture has a same POC (picture order count) and ViewId (view identifier) as the reference texture picture as shown in step 340. The current depth block is then encoded using the texture merging candidate as shown in step 350.

Figure 4:
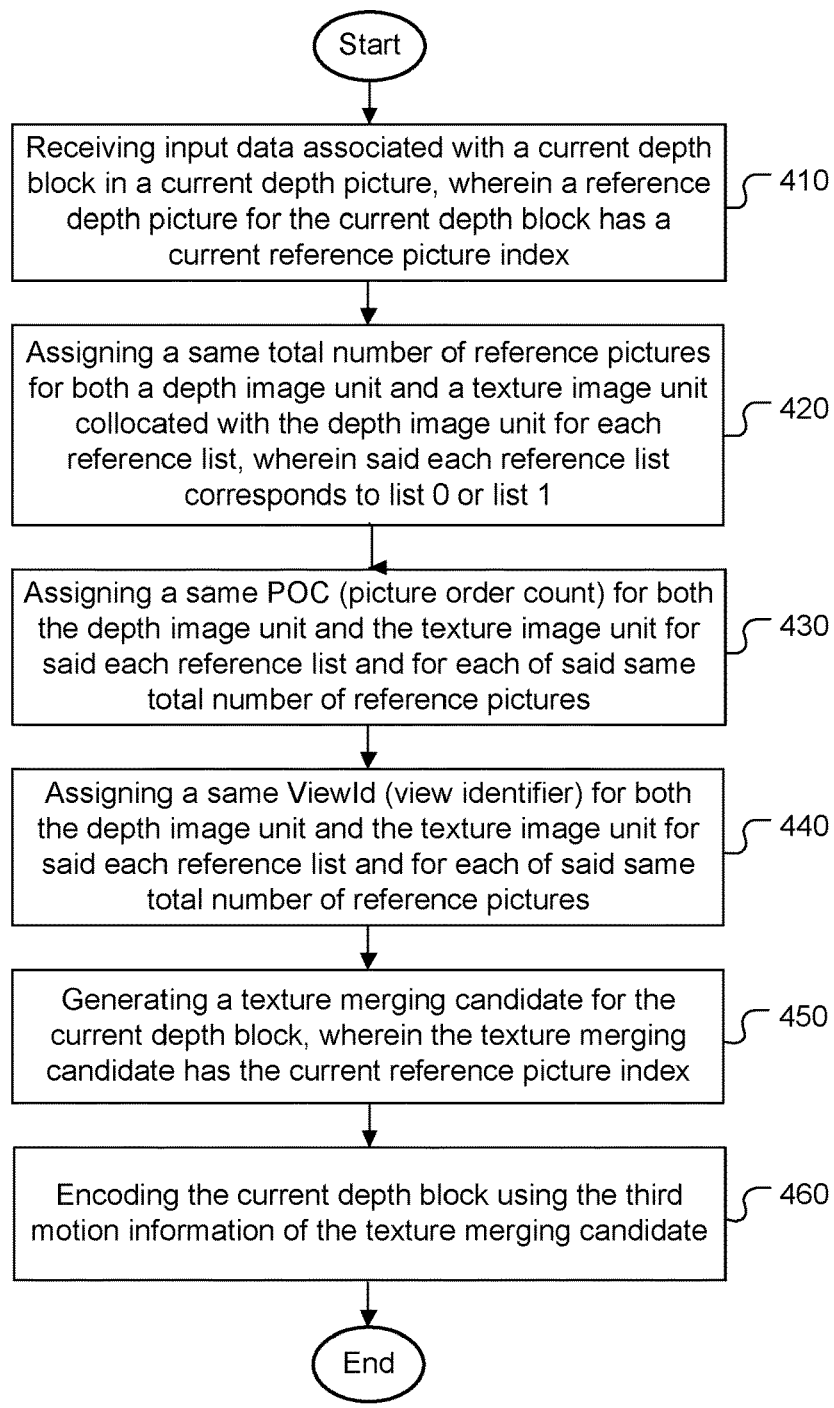
FIG. 4 illustrates an exemplary flowchart a three-dimensional coding system incorporating of texture merging candidate derivation according to another embodiment of the present invention.

FIG. 4 illustrates an exemplary flowchart of a three-dimensional coding system incorporating texture merging candidate derivation according to another embodiment of the present invention. A current depth block in a current depth picture is received in step 410, where a reference depth picture for the current depth block has a current reference picture index. A same total number of reference pictures is configured for both a depth image unit and a texture image unit collocated with the depth image unit for each reference list in step 420, where said each reference list corresponds to list 0 or list 1. A same POC (picture order count) and a same ViewId (view identifier) are configured for both the depth image unit and the texture image unit for said each reference list and for each of said same total number of reference pictures as shown in steps 430 and 440. A texture merging candidate is generated for the current depth block in step 450, wherein the texture merging candidate has the current reference picture index. The current depth block is then encoded using the third motion information of the texture merging candidate as shown in step 460.

The flowcharts shown above are intended to illustrate examples of texture merging candidate derivation for 3D coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of depth map coding for a video coding system, the method comprising:
   receiving data corresponding to a current depth block in a current depth picture;
   determining one or more reference depth pictures arranged in at least one reference list, each of the one or more reference depth pictures is associated with a respective reference depth index;
   receiving motion information of a collocated texture block that is collocated with the current depth block, wherein the motion information of the collocated texture block indicates a reference texture picture for coding the collocated texture block;

determining if the one or more reference depth pictures include a particular reference depth picture that has a same POC (picture order count) syntax element value and ViewId (view identifier syntax element value as the reference texture picture; and in response to a determination result that the one or more reference depth pictures include the particular reference depth picture;

generating a texture merging candidate for the current depth block based on the motion information of the collocated texture block, and decoding the current depth block using the texture merging candidate.

2. The method of claim 1, wherein
the reference texture picture has a reference texture index different from a reference depth index of the particular reference depth picture.

3. The method of claim 1, wherein
the at least one reference list corresponds to a reference list 0 or a reference list 1, and
the method further comprises:
   in response to a determination result that a particular reference list of the at least one reference list does not include the particular reference depth picture, determining that the particular reference list is not used for processing the current depth block.

4. The method of claim 3, further comprising:
selecting no valid texture merging candidate in response to the current depth picture being a P-picture and the reference list 0 being determined as not used.

5. The method of claim 3, further comprising:
selecting no valid texture merging candidate in response to the current depth picture being a B-picture and either the reference list 0 or the reference list 1 being determined as not used.

6. The method of claim 1, further comprising:
in response to a determination result that the one or more reference depth pictures do not include the particular reference depth picture, generating the texture merging candidate for the current depth block by scaling a motion vector of the collocated texture block.

7. An apparatus of depth map coding for a video coding system, the apparatus comprising one or more electronic circuits configured to:
   receive data corresponding to a current depth block in a current depth picture;
   determine one or more reference depth pictures arranged in at least one reference list, each of the one or more reference depth pictures is associated with a respective depth index;
   receive motion information of a collocated texture block that is collocated with the current depth block, wherein the motion information of the collocated texture block indicates a reference texture picture for coding the collocated texture block;
   determine if the one or more reference depth pictures include a particular reference depth picture that has a same POC (picture order count) syntax element value and ViewId (view identifier) syntax element value as the reference texture picture; and
   in response to a determination result that the one or more reference depth pictures include the particular reference depth picture,
   generate a texture merging candidate for the current depth block based on the motion information of the collocated texture block, and
   decode the current depth block using the texture merging candidate.

8. The apparatus of claim 7, wherein
the reference texture picture has a reference texture index different from a reference depth index of the particular reference depth picture.

9. The apparatus of claim 7, wherein
the at least one reference list corresponds to a reference list 0 or a reference list 1, and
the one or more electronic circuits are further configured to:
   in response to a determination result that a particular reference list of the at least one reference list does not include the particular reference depth picture,
   determine that the particular reference list is not used for processing the current depth block.

10. The apparatus of claim 9, wherein the one or more electronic circuits are further configured to:
   select no valid texture merging candidate in response to the current depth picture being a P-picture and the reference list 0 being determined as not used.

11. The apparatus of claim 9, wherein the one or more electronic circuits are further configured to:
   select no valid texture merging candidate in response to the current depth picture being a B-picture and either the reference list 0 or the reference list 1 being determined as not used.

12. The apparatus of claim 7, wherein the one or more electronic circuits are further configured to:
   in response to a determination result that the one or more reference depth pictures do not include the particular reference depth picture, generate the texture merging candidate for the current depth block by scaling a motion vector of the collocated texture block.

* * * * *